(12) United States Patent
Dahlback et al.

(10) Patent No.: US 9,737,844 B2
(45) Date of Patent: Aug. 22, 2017

(54) WATER ABSORPTION USING AN INSULATED HOUSING

(71) Applicant: Airwatergreen AB, Uppsala (SE)

(72) Inventors: Per Dahlback, Uppsala (SE); Jonas Wamstad, Uppsala (SE); Fredrik Edstrom, Uppsala (SE)

(73) Assignee: AIRWATERGREEN AB, Uppsala (SE)

( * ) Notice: Subject to any disclaimer, the term of this patent is extended or adjusted under 35 U.S.C. 154(b) by 0 days.

(21) Appl. No.: 14/662,686

(22) Filed: Mar. 19, 2015

(65) Prior Publication Data
US 2015/0265962 A1 Sep. 24, 2015

(30) Foreign Application Priority Data

Mar. 20, 2014 (SE) ...................................... 1450313

(51) Int. Cl.
*B01D 53/02* (2006.01)
*B01D 53/04* (2006.01)
*B01D 53/26* (2006.01)

(52) U.S. Cl.
CPC ....... *B01D 53/0438* (2013.01); *B01D 53/261* (2013.01); *B01D 53/265* (2013.01); *B01D 2257/80* (2013.01); *B01D 2259/40096* (2013.01)

(58) Field of Classification Search
CPC ...... B01D 2257/80; B01D 2259/40096; B01D 53/0438; B01D 53/261; B01D 53/265
See application file for complete search history.

(56) References Cited

U.S. PATENT DOCUMENTS

| 4,310,382 A * | 1/1982 | Gress ...................... B01D 1/14 159/16.1 |
| 5,251,458 A * | 10/1993 | Tchernev ............... B01D 46/00 62/271 |
| 5,343,632 A * | 9/1994 | Dinh ...................... F26B 21/086 34/507 |
| 6,442,951 B1 * | 9/2002 | Maeda .................. F24F 3/1423 62/271 |
| 2005/0044862 A1 | 3/2005 | Vetrovec et al. |
| 2006/0144226 A1 | 7/2006 | Damrath et al. |
| 2009/0151368 A1 | 6/2009 | Bar |
| 2010/0170499 A1 | 7/2010 | Bar |
| 2011/0197879 A1 * | 8/2011 | Levin ................... B01D 1/0035 126/636 |

FOREIGN PATENT DOCUMENTS

| WO | 2008-018071 | 2/2008 |
| WO | 2015-005791 | 1/2015 |

OTHER PUBLICATIONS

Extended European search report, dated Jul. 8, 2015, in corresponding European Patent Application No. 151600772.2.

* cited by examiner

*Primary Examiner* — Christopher P Jones
(74) *Attorney, Agent, or Firm* — Young & Thompson

(57) ABSTRACT

Disclosed is a device for adsorbing water using a sealable housing containing a water adsorbing material and a heat pump.

20 Claims, 4 Drawing Sheets

WATER ABSORPTION USING AN INSULATED HOUSING

FIELD OF THE INVENTION

The present invention relates to a device for adsorbing water from a gas and a method of adsorbing water from gas.

BACKGROUND

There are many ways of extracting water from air but many of them are struggling with efficiency and that they demand a lot of energy.

Heat pumps are efficient when it comes to transferring heat. The ratio between the energy that the pump may transfer and the total amount of energy that may be transferred is referred to Coefficient of Performance (COP). The COP factor depends on a number of parameters such as temperature and what kind of cooling media is used. When the heat pump transfers heat from one place to another a cold and a warm surface is formed in the heat pump. The warm surface may be used for heating while the cold surface may be used for cooling.

The cold surface may also be used to condense vaporised water from the air. The amount of water that may be condensed from 1 m³ air depends on its initial temperature and the amount of vapour in the air as well as to what temperature the air is cooled.

This method of condensing vapour from air has a disadvantage since the condensed water freezes at 0° C. This results in the formation of ice on the cold side and that the condensed water may not be conveyed. Since the air has a dewpoint below 0° C. the air needs to be cooled below 0° C. in order for the vapour to condense. This limits of course when a heat pump may be used to condense vapour from air. Today one way of solving the problem is to regularly stop the heat pump and heat the cold surface and remove the formed ice. However this is both time and energy consuming.

Another method used for extracting vapour is to adsorb water using a hygroscopic material. By using a hygroscopic material the vapour in the air may be adsorbed and stored in the material. The amount of water that may be stored in a hygroscopic material depends on the materials ability to adsorb at different humidity. When the hygroscopic material is heated the vapour pressure of the material increases. When the vapour pressure in the hygroscopic material becomes higher than the surrounding vapour pressure the adsorbed water is vaporised. In this way hygroscopic materials may be regenerated and reused. The amount of water that may be adsorbed/desorbed per second is described by:

$$\dot{r}=k_bA_o(P_m-P_a) \quad (1)$$

where $\dot{r}$ is the amount of water adsorbed/desorbed per second, k is a material constant, A is the area of the hygroscopic material and $P_m$ is the vapour pressure in the hygroscopic material and $P_a$ is the vapour pressure in the air.

In order for the adsorbed water to leave the hygroscopic material it needs to be vaporized and for that vaporisation energy is needed. This energy is taken from the heat and creates cooling. This cools the hygroscopic material resulting in a lower vapour pressure in the hygroscopic material when the water is vaporized. More heat needs then to be added in order to keep the material warm.

The systems of prior art suffers from some drawbacks such as formation of ice and cooling of hygroscopic materials due to vaporization. Overcoming these issues would lead to more efficient methods to control air humidity and to condense water vapour.

SUMMARY OF THE INVENTION

The object of the present invention is to provide a device which overcomes the drawbacks of prior art.

In a first aspect the present invention relates to a water adsorption device comprising:
  a thermally insulated housing having a sealable inlet and a sealable outlet;
  a container within the housing, separating the housing in a first and a second compartment respectively, the container having at least one inlet and one outlet, wherein the inlet of the container communicates with the sealable inlet of the housing and the outlet of the container communicates with the sealable outlet of the housing; whereby a gas can flow into the container from the first compartment and out from the container into the second compartment,
  a water adsorbing material confined within the container;
  whereby the device is configured to allow a gas to flow from the sealable inlet of the housing through the container in contact with the water adsorbing material in the container to the sealable outlet of the housing;
  wherein the housing has at least one condensation surface wherein said condensation surface is arranged in the housing to allow condensation of vapour in the gas;
  a heating device arranged in the space between the condensation surface and the container and/or in thermal contact with the water adsorbing material and/or the container;
  wherein the device further comprises a heat pump configured to heat the water adsorbing material and configured to cool the condensation surface.

In a second aspect the present invention relates to a method of adsorbing water from a gas comprising:
  a. providing a device according to the present invention;
  b. bringing a gas flow into contact with the water adsorbing material;
  c. letting the water adsorbing material adsorb vapour or water from the gas;
  d. sealing the housing;
  e. heating the water adsorbing material until the space between the container and the inner surface has a dewpoint above 0° C.;
  f. continuing heating of the water adsorbing material;
  g. letting vapour condense on the condensation surface;
  h. collecting condensed water; and
  i. unsealing of the housing.

The embodiments presented below are applicable to both aspects of the present invention.

DETAILED DESCRIPTION OF THE INVENTION

In the present application the wordings "water adsorbing material", "water adsorption material" and "hygroscopic material" are used interchangeably.

The device according to the present invention is designed for water adsorption from a gas, for example from air. The device may be integrated into another device or may be a standalone device.

Figure 1A:
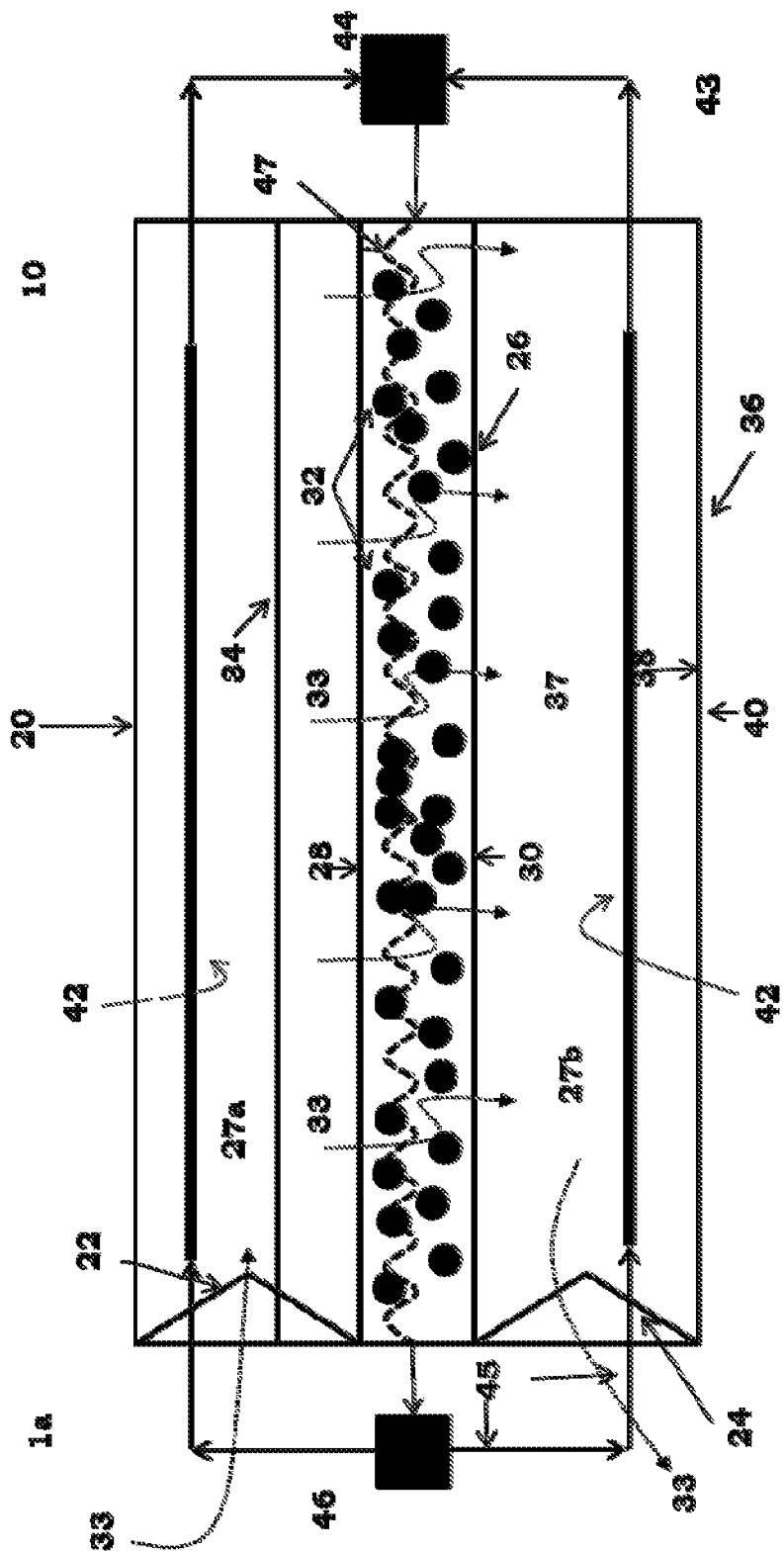
FIGS. 1 a and b, cross-sections of embodiments of the device according to the present invention.
Figure 1B:
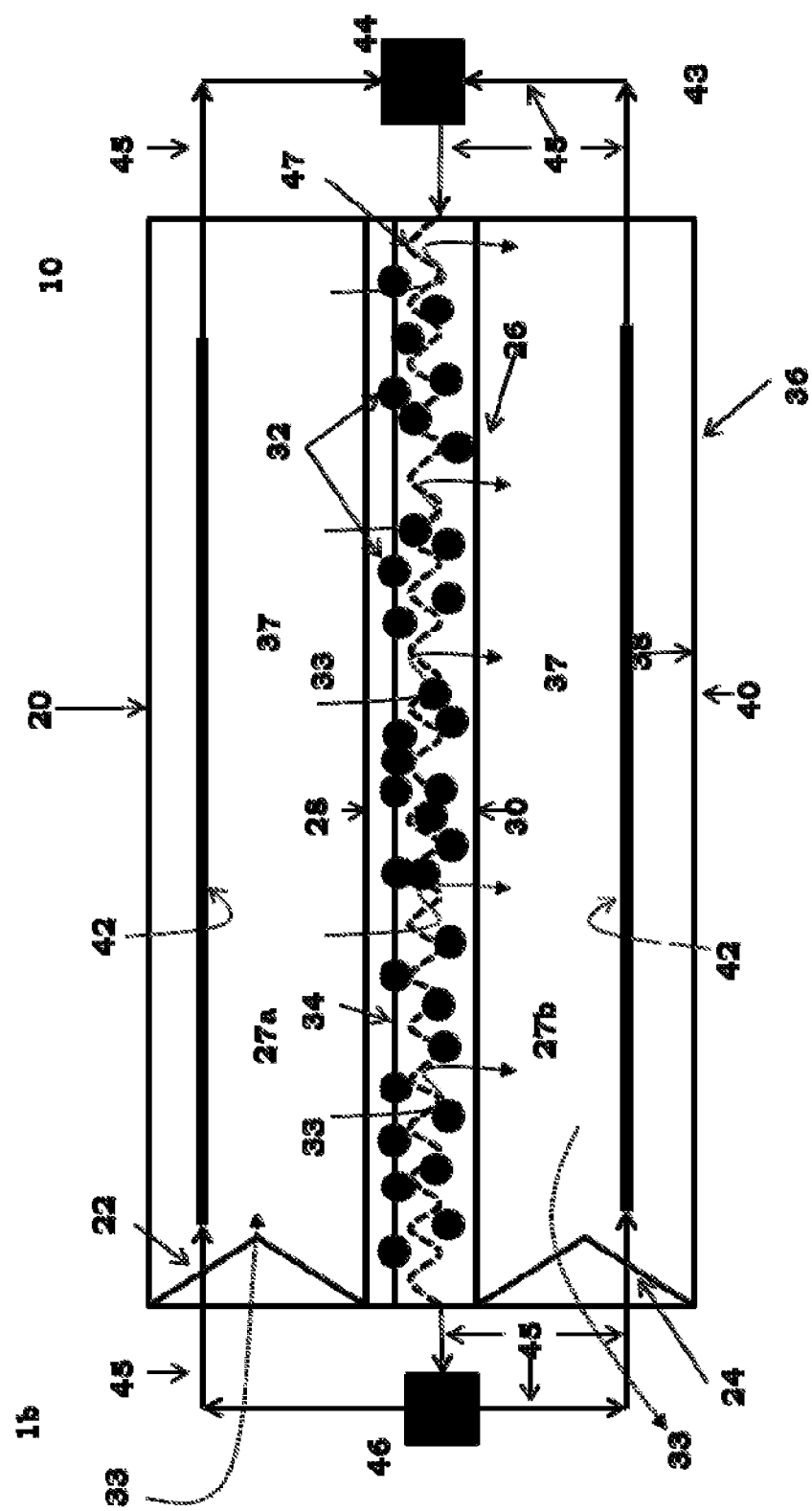

Referring now to FIGS. 1a and 1b. The water adsorption device 10 according to the present invention comprises an insulated housing 20 with a sealable inlet 22 and a sealable outlet 24 and where said inlet and outlet are both sealable using any suitable means to close and seal said inlet and outlet. The housing comprises a container 26 separating the housing in a first 27a and a second 27b compartment respectively. The container has at least one inlet 28 and at least one outlet 30 which both are in communication with the sealable inlet 22 and the sealable outlet 24 of the housing respectively. The container is preferably heat insulated and preferably made of stainless steel. The container comprises a water adsorption material 32 which may be any suitable material for example molecular sieves, active carbon, zeolite, silica gel, LiCl, CaCl, $NaNO_3$, wood, sulphates or any suitable material known to a person skilled in the art or combinations thereof. The water adsorption material may be in shape of particles, powder or solid. The inlets and the outlets of the housing and the container are arranged so that gas 33 may flow from the sealable inlet 22 of the housing into the first compartment 27a and into the container 26 via inlet 28 of the container so that the gas comes in contact with the water adsorbing material 32. The gas will then exit the container 26 through the outlet 30 and into the second compartment 27b and then out through the sealable outlet 24 of the housing 20. The dotted arrows in FIG. 1 represent the gas flow. A condensation surface 42 of the housing is arranged in the housing to allow condensation of vapour in the gas. The surface 42 may be positioned at least partly facing the inlet and/or the outlet of the container or positioned perpendicular to the inlet and/or the outlet of the container. In one embodiment the surface 42 forms a space 37 between the wall 36 and the container 26. A heating device 34 is arranged in the space 37 (FIG. 1a) and/or in thermal contact with the water adsorbing material 32 and/or the container 26 (FIG. 1b). The surface 42 may be arranged opposite to the outlet 30 of the container in the direction of the gas flow and/or opposite to the inlet 28 of the container. The container may be in the form of a net, a cage or a perforated surface and may be made of for example a metal or a metal alloys, for example aluminium. The device further comprises a heat pump 43 configured to heat the hygroscopic material 32 and configured to provide the condensation surface 42 inside the housing 20 and where said surface allows water to condense on it. The surface 42 has a temperature low enough in order for vapour in the gas flow to condense on said surface. The heat pump 43 may be defined to comprise a circulating system 45 for a cooling/heating media. The system 45 comprises in sequence the condensation surface 42, a compressor 44, a heater 47 and an expansion tank 46 and where all parts are connected via suitable tubing and configured so that the cooling/heating media circulates. The heater 47 may be arranged in the space 37 and/or in thermal contact with the water adsorbing material 32 and/or the container 26.

Figure 2:
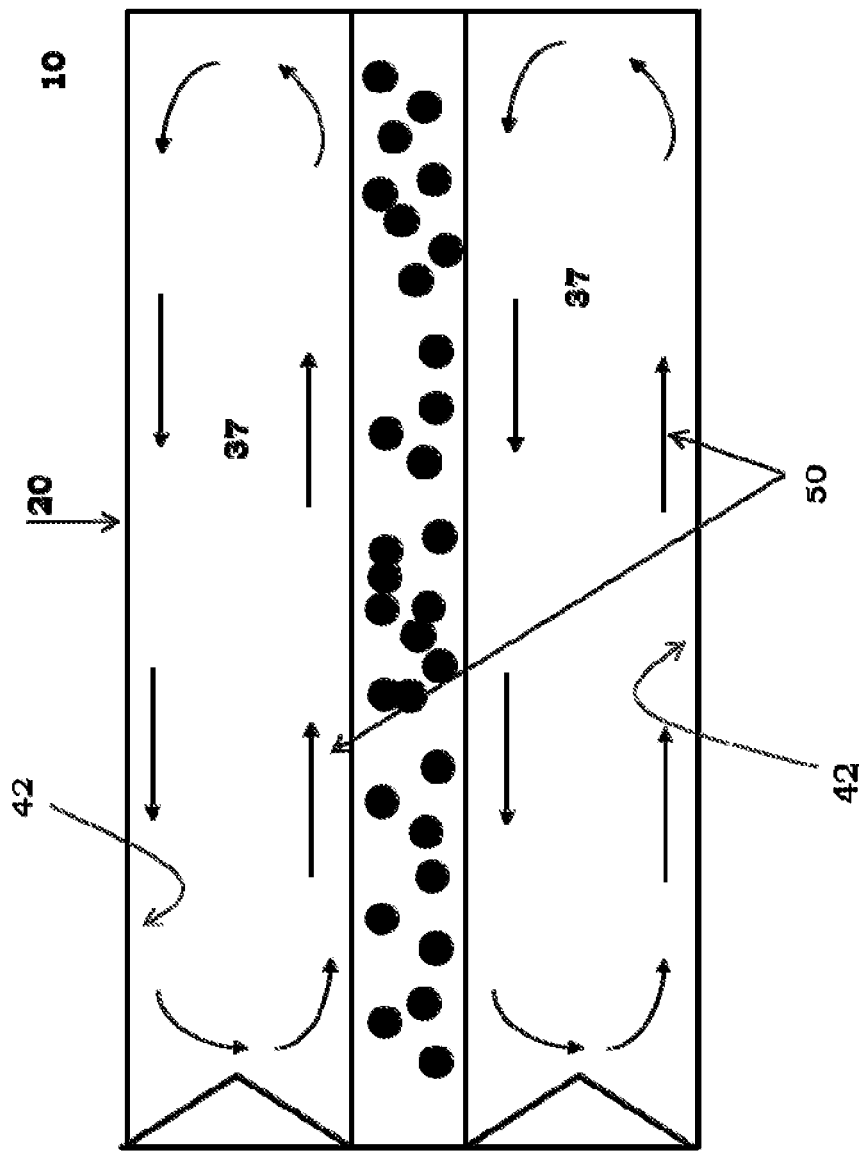
FIG. 2, cross-sectional view showing convectional flow inside the housing.
Figure 3:
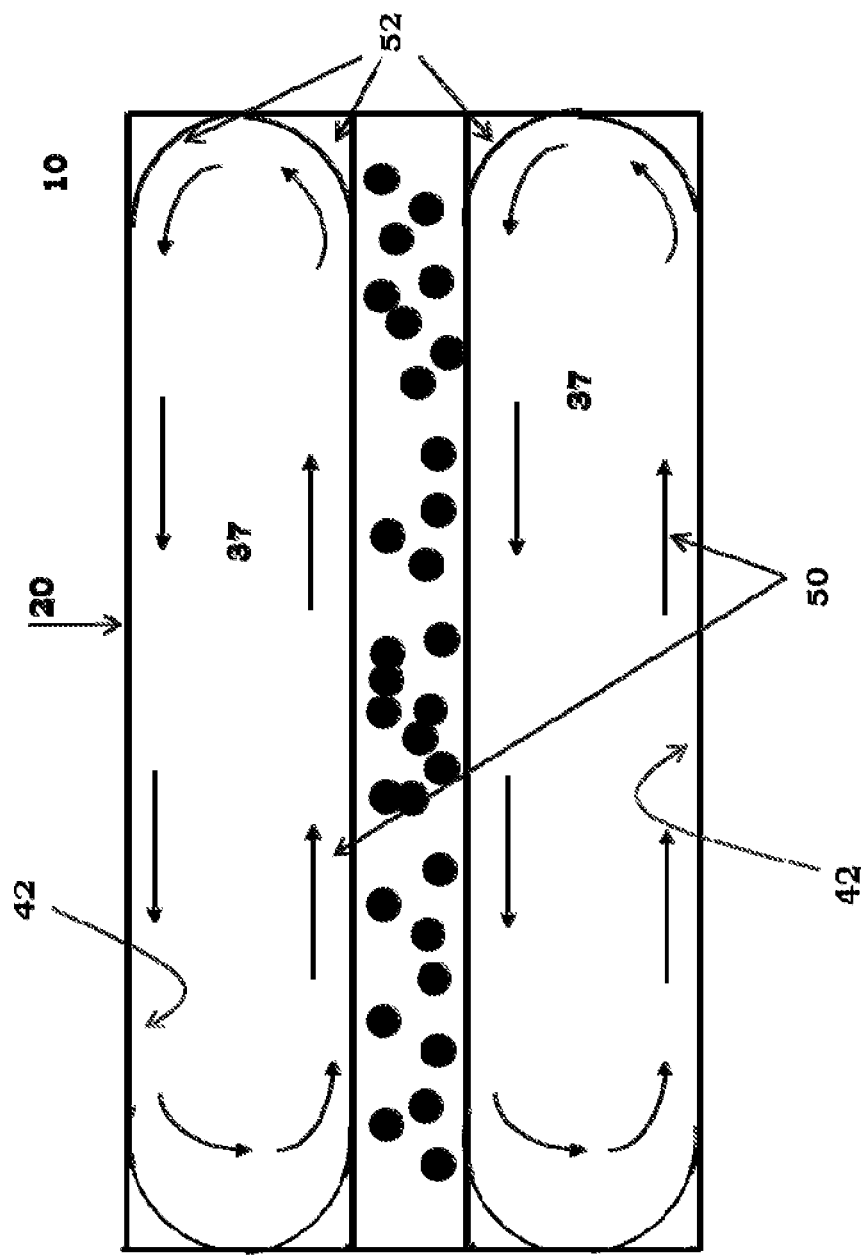
FIG. 3, cross-section of one embodiment of the device according to the present invention.

The condensation surface 42 may be arranged in the space 37 (FIG. 1) or may be arranged on or as the inner surface 38 (FIGS. 2 and 3). The compressor 44 and the expansion tank 46 may each be arranged inside the insulated housing or outside. The tubing should preferably be insulated in order to minimize energy losses.

When the heat pump 43 starts to generate heat which may be delivered to the water adsorption material via the heater 47 the heating device 34 may be turned off or at least does not have to run on full effect and thereby saving energy. The heating device 34 may be maneuvered using electricity, fuel cells, solar energy or in any other suitable way and the heat could be supplied via electricity, microwaves (for example via the microwave oven principle) or via solar energy.

The heating device 34 may also be connected to a sealing control mechanism to optimize the process of when the sealable inlet and sealable outlet should be opened and closed and when the heating procedure of the water adsorption material should start. Additionally, the housing is preferably constructed in such a way that the gas volume inside a sealed housing remains substantially constant during heating of the water adsorbing material. This may be accomplished by securing or locking the sealing after closing or using a check valve as a sealing.

The present invention is based on the fact that a water adsorption material confined in a container adsorbs, and to some extent maybe also absorbs, water from the surrounding gas, preferably air, and for example to the point of saturation. Thus, after having allowed the water adsorption material to adsorb water, the housing is sealed using a lid or any suitable cover and the water adsorption material is then heated using the heating device, and later also the heater. The process of releasing the water from the water adsorbing material is driven by the difference in vapour pressure of the water in the gas and the water adsorbed in the water adsorbing material. The amount of water released from the water adsorption material to the surroundings can, as mentioned above, be described by Eq. [1].

When the water is vaporized it creates a cooling in the hygroscopic material. The cooling from the vaporization is described by $$P_c = \dot{r} E_V \qquad (2)$$

where $P_c$ is the cooling power and $E_V$ is the vaporization energy. The released water vapour will increase the dew point in the space 37. When the dew point is higher than the temperature on the condensation surface 42, condensation will occur. In the present invention the temperature on the condensation surface is above 0 degrees Celsius.

When the water vapour is condensed on the condensing surface 42 the condensation creates heat. The heating on the condensation surface from the condensed water vapour is equivalent described as $$P_H = \dot{c} E_V \qquad (3)$$

where $P_H$ is the heating power and $\dot{c}$ is the amount of condensed water vapour per second. The power, $P_H$, is then transferred back to the water adsorption material via the heater 47. The power needed from the heating device to keep a constant temperature in the hygroscopic material is then reduced with $P_H$.

Thus, in the special case when $$P_H = P_C \qquad (4)$$

all vaporization energy is transferred back to the hygroscopic material. The condensation surface is also heated from thermal convection, conduction and radiation from the hygroscopic material and the container. This thermal energy is also transferred back to the hygroscopic material via the heater.

The condensation surface may be made of metals or metal alloys or any other heat conductive material. The walls of the container and/or the housing may be made of but not limited to metals or metal alloys. Walls made of a heat insulation material will reduce thermal losses. Therefore, the walls of the housing are preferably made of a heat insulation material.

The housing may be thermally insulated from the container with the water adsorbing material, heater and heating device so that the housing is not heated during heating of the water adsorbing material. The housing may be made of a non-transparent material, in one embodiment the housing has a small window for inspection.

Now referring to FIGS. 2 and 3 (the figures are schematic and do not disclose all the features of the device). The convectional flow 50 formed in the housing between the container 26 and the condensing surface 42 and/or the wall of the housing 36 is believed to be beneficial since it increases the transfer of water vapour from the container and the water adsorption material to the condensation surface, see FIG. 2. In order to increase or improve the convectional flow inside the housing a fan may be arranged in the housing or the housing may have rounded corners 52 inside the housing, see FIG. 3.

The temperature of the condensation surface should be at least 0° C., preferably more than 20° C., or preferably more than 40° C., or preferably more than 60° C. but less than 120° C., or less than 100° C., or less than 80° C. In one embodiment the temperature is from 40 to 90° C. In another embodiment the temperature is 65-75° C., preferably 70° C.

The temperature of the water adsorption material should be higher than that of the condensation surface preferably 70° C. or higher, or 90° C. or higher, or 110° C. or higher. In one embodiment the temperature is between 100-140° C., such as 110-130° C., preferably 120° C.

In order to obtain a better transfer of water vapour and hence a more energy efficient system; the height, length and the temperature difference between the container and the condensation surface can be chosen such that the Sherwood number is maximized. The Sherwood number can be used to estimate the advective water vapour transport between the container and the condensation surface. The Sherwood number is used to scale the diffusion coefficient due to circular motion created inside the housing. The Sherwood number is given by $$Sh = 0.42 Ra^{\frac{1}{4}} Sc^{0.012} \left(\frac{L_H}{L_G}\right)^{-0.3} = 0.42 \left(\frac{g\beta Pr L_G^3 (T_h - T_c)}{v}\right)^{\frac{1}{4}} \frac{\mu}{\rho D} \left(\frac{L_H}{L_G}\right)^{-0.3} \quad (5)$$

where Ra is the Rayleighs numbers, Sc is the Schmidt number, $L_H$ is the height of the housing, $L_G$ is the distance between the container surface and the condensation surface, g is the gravitational acceleration, β is the thermal expansion given by $$\beta = \frac{1}{\hat{T}},$$

where $\hat{T}$ is the mean value of the temperature between the container surface and the condensation surface, Pr is the Prandtls number, $T_H$ is the temperature on the container surface, $T_c$ is the temperature on the condensation surface, V is the kinematic viscosity of the gas, μ dynamic viscosity, ρ is the density and D is the binary vapor mass diffusion coefficient.

The heating/cooling media of the heat pump 43 is dependent on the temperature wanted for the heater and the condensation surface. In one embodiment it is a media having a boiling point between 50 and 150° C., preferably between 65 and 120° C. It is also preferable that the media has high vaporisation energy, preferably more than 1000 kJ/kg, or more than 1500 kJ/kg, or more than 2000 kJ/kg. The media may be selected from but not limited to water or lower alcohols such as C1-C5 alcohols or mixtures thereof. In one embodiment the mixture is water-ethanol or water-isopropanol.

The walls and the bottom of the housing 20 or the condensation surface 42 may preferably be constructed in such a way that the liquidized water is assembled. This may be accomplished by having grooves, trenches, channels or the like in or along the walls of the housing or condensation surface, they may further continue along the bottom plate of the housing towards an assembling spot. These grooves, trenches or channels could be made of or covered with hydrophobic material. The bottom plate could be constructed in such a way that all the water from the walls and from the hygroscopic material is assembled. This could be achieved by having the bottom lean into one or more spots. The housing has preferably a draining element which could be but is not limited to a tap, faucet or an outlet, or the housing may contain a removable tray where the condensed water is collected and could be discharged from.

The present invention is aimed at extracting water from gas, preferably air, to either produce water or remove the water from the gas. The latter could be used for example, but not limited to, for dehumidification of indoor environments or in air-conditioning devices.

The invention claimed is:

1. A water adsorption device comprising:
  a thermally insulated housing (20) having a sealable inlet (22) and a sealable outlet (24);
  a container (26) within the housing (20), the container (26) separating the housing in a first compartment (27a) and a second compartment (27b) respectively, the container (26) having at least one inlet (28) and one outlet (30), wherein the inlet (28) of the container (26) communicates with the sealable inlet (22) of the housing and the outlet (30) of the container (26) communicates with the sealable outlet (24) of the housing, whereby gas can flow into the container (26) from the first compartment (27a) and out from the container (26) into the second compartment (27b);
  a water adsorbing material (32) confined within the container (26),
  whereby the device is configured to allow the gas to flow from the sealable inlet (22) of the housing through the container (26) in contact with the water adsorbing material (32) in the container (26) to the sealable outlet (24) of the housing,
  wherein the housing has at least one condensation surface (42), wherein said condensation surface is arranged in the housing to allow condensation of vapour in the gas;
  a heating device (34) arranged in one of the group consisting of i) a space (37) between the condensation surface (42) and the container (26), ii) in thermal contact with the water adsorbing material, and iii) in thermal contact with the container (26); and
  a heat pump (43) configured to heat the water adsorbing material (32) and configured to cool the condensation surface (42).

2. The device according to claim 1 wherein the housing is made of a non-transparent material.

3. The device according to claim 1 wherein the temperature of the condensation surface is from 40 to 90° C.

4. The device according to claim 1 wherein a fan is arranged in the housing in order to increase the convectional flow.

5. The device according to claim 1 wherein the container is made of stainless steel.

6. The device according to claim 1 wherein the condensation surface is arranged in the wall of the housing or positioned at least partly facing the inlet and/or the outlet of the container or positioned perpendicular to the inlet and/or the outlet of the container.

7. The device according to claim 1 wherein the heat pump uses a media having a vaporisation energy of more than 1000 kJ/kg.

8. A method of adsorbing water from a gas comprising:
a. providing a device according to claim 1;
b. bringing a gas flow into contact with the water adsorbing material;
c. letting the water adsorbing material adsorb vapour or water from the gas;
d. sealing the housing;
e. heating the water adsorbing material with the heating device or with heat from the heat pump until the space between the container and the inner surface of the housing has a dew point above 0 degree Celsius;
f. continuing heating of the water adsorbing material;
g. letting vapour condense on the condensation surface;
h. collecting condensed water; and
i. unsealing of the housing.

9. The method according to claim 8 wherein the condensing surface has a temperature of 20° C. to 100° C.

10. The method according to claim 8 wherein the water adsorption material in step e is heated to a temperature of 100-140° C.

11. The device according to claim 2 wherein the temperature of the condensation surface is from 40 to 90° C.

12. The device according to claim 2 wherein the container is made of stainless steel.

13. The device according to claim 3 wherein the container is made of stainless steel.

14. The device according to claim 4 wherein the container is made of stainless steel.

15. The device according to claim 2 wherein the condensation surface is arranged in the wall of the housing or positioned at least partly facing the inlet and/or the outlet of the container or positioned perpendicular to the inlet and/or the outlet of the container.

16. The device according to claim 1, wherein the heating device (34) is arranged in the space (37) between the condensation surface (42) and the container.

17. The device according to claim 1, wherein the heating device (34) is arranged in thermal contact with the water adsorbing material.

18. The device according to claim 1, wherein the heating device (34) is arranged in thermal contact with the container.

19. The device according to claim 1, wherein
the thermally insulated housing (20) is configured, i) after having allowed the water adsorption material to adsorb water, to seal the seal thermally insulated housing (20) including sealing the sealable inlet (22) and sealing the sealable outlet (24) for allowing the water adsorption material to be heated for a process of releasing the water from the water adsorbing material, and ii) after the process of releasing the water from the water adsorbing material, unsealing of the housing including unsealing the sealable inlet (22) and unsealing the sealable outlet (24),
the heat pump (43) is comprised of the condensation surface (42), a compressor (44), a heater (47) and an expansion tank (46) connected via tubing and configured so that cooling and heating media circulates, wherein the heater (47) is arranged in one of the group consisting of the space (37) between the condensation surface (42) and the container (26), in thermal contact with the water adsorbing material (32), and in thermal contact with the container (26), and
the heat pump (43) is further configured to, during the process of releasing the water from the water adsorbing material, generate heat that is delivered to the water adsorption material via the heater (47) to heat the water adsorption material for release of the water from the water adsorbing material by condensation onto the condensation surface (42).

20. The device according to claim 1, wherein
the thermally insulated housing (20) is configured, i) after having allowed the water adsorption material to adsorb water, to seal the seal thermally insulated housing (20) including sealing the sealable inlet (22) and sealing the sealable outlet (24) for allowing the water adsorption material to be heated by the heat pump (43) for a process of releasing the water from the water adsorbing material, and ii) after the process of releasing the water from the water adsorbing material, unsealing of the housing including unsealing the sealable inlet (22) and unsealing the sealable outlet (24), and
the heat pump (43) is further configured to, during the process of releasing the water from the water adsorbing material, i) generate heat that is delivered to the water adsorption material to heat the water adsorption material for release of the water from the water adsorbing material by condensation onto the condensation surface (42), and ii) cool the condensation surface (42).

* * * * *